(12) United States Patent
Windom et al.

(10) Patent No.: US 9,416,937 B2
(45) Date of Patent: Aug. 16, 2016

(54) THIN PROFILE LENS FOR FLASHLIGHT

(75) Inventors: Gregory David Windom, Portland, OR (US); David C. Brands, Portland, OR (US)

(73) Assignee: Coast Cutlery Co., Portland, OR (US)

(*) Notice: Subject to any disclaimer, the term of this patent is extended or adjusted under 35 U.S.C. 154(b) by 196 days.

(21) Appl. No.: 13/490,275

(22) Filed: Jun. 6, 2012

(65) Prior Publication Data

US 2013/0329408 A1    Dec. 12, 2013

(51) Int. Cl.
| | |
|---|---|
| *G02B 3/00* | (2006.01) |
| *F21V 5/04* | (2006.01) |
| *F21L 4/00* | (2006.01) |
| *F21V 13/04* | (2006.01) |
| *F21V 14/02* | (2006.01) |
| *F21V 19/02* | (2006.01) |
| *F21L 4/02* | (2006.01) |

(Continued)

(52) U.S. Cl.
CPC . *F21V 5/04* (2013.01); *F21L 4/005* (2013.01); *F21L 4/027* (2013.01); *F21V 13/04* (2013.01); *F21V 14/025* (2013.01); *F21V 19/02* (2013.01); *G02B 3/00* (2013.01); *G02B 19/0061* (2013.01); *F21V 14/065* (2013.01); *F21V 29/20* (2013.01); *F21Y 2101/02* (2013.01)

(58) Field of Classification Search
CPC ........... F21V 5/04; F21V 19/02; F21V 13/04; F21V 14/025; F21V 29/20; F21V 14/065; G02B 3/00; G02B 19/0061; F21L 4/005; F21L 4/027; F21Y 2101/02
USPC ......... 362/187, 188, 196–208, 157, 335, 520, 362/522, 308, 311.06, 333; 257/E33.073, 257/99, 676
See application file for complete search history.

(56) References Cited

U.S. PATENT DOCUMENTS 1,778,039 A    10/1930  Rogge
3,717,759 A     2/1973  Rousseau (Continued)

FOREIGN PATENT DOCUMENTS

CN    201145208 Y    11/2008
CN    101865362 A    10/2010

(Continued)

OTHER PUBLICATIONS

International Search Report and Written Opinion, issued in PCT Application No. PCT/US2013/043556, mailed Sep. 25, 2013, 12 pages.

(Continued)

*Primary Examiner* — Stephen F Husar
*Assistant Examiner* — Danielle Allen
(74) *Attorney, Agent, or Firm* — Schwabe Williamson & Wyatt

(57) ABSTRACT

The present disclosure relates to a thin-profile lens for shaping a beam of light from a light source, such as a light emitting diode (LED), for example in a flashlight or other lighting unit. In various embodiments, the lens may be combined with an adjustment mechanism for varying the focus of the beam of light, and may be housed in a structure supporting the lens, light source, and adjustment mechanism. In various embodiments, the structure also may include a power source, controls, interconnections, and electronics. In various embodiments, the thin profile of the lens may allow the lens to be used in any of a number of applications, ranging from narrow diameter flashlights to large diameter light sources.

21 Claims, 6 Drawing Sheets

(51) Int. Cl.
*G02B 19/00* (2006.01)
*F21Y 101/02* (2006.01)
*F21V 29/00* (2015.01)
*F21V 14/06* (2006.01)

(56) References Cited

U.S. PATENT DOCUMENTS

| | | | |
|---|---|---|---|
| 4,656,565 A | 4/1987 | Maglica | |
| 4,821,156 A | 4/1989 | Siefert et al. | |
| 4,841,417 A | 6/1989 | Maglica et al. | |
| 5,904,414 A | 5/1999 | Monteleone et al. | |
| 6,231,208 B1 | 5/2001 | Dalton | |
| 6,536,923 B1 | 3/2003 | Merz | |
| 6,547,423 B2 | 4/2003 | Marshall et al. | |
| 7,349,163 B2 | 3/2008 | Angelini et al. | |
| 7,461,945 B2 | 12/2008 | Shiau | |
| 7,473,007 B1 | 1/2009 | Wang | |
| 7,748,872 B2 | 7/2010 | Holder et al. | |
| 8,152,327 B2 | 4/2012 | Lewin et al. | |
| 8,371,710 B2 | 2/2013 | Gupta et al. | |
| 8,485,683 B2 | 7/2013 | Popper et al. | |
| 8,579,485 B2 * | 11/2013 | Hara | F21S 48/215 362/327 |
| 8,721,111 B2 | 5/2014 | Yeh | |
| 2003/0189826 A1 * | 10/2003 | Yoon | 362/205 |
| 2004/0190299 A1 | 9/2004 | Chapman | |
| 2006/0109669 A1 | 5/2006 | Tanaka | |
| 2006/0209558 A1 | 9/2006 | Chinniah | |
| 2007/0189013 A1 | 8/2007 | Ford | |
| 2007/0263390 A1 * | 11/2007 | Timinger | F21L 4/00 362/308 |
| 2008/0068833 A1 | 3/2008 | Shiau | |
| 2009/0109687 A1 * | 4/2009 | Householder | F21L 4/027 362/309 |
| 2009/0225552 A1 | 9/2009 | Chen | |
| 2009/0257230 A1 | 10/2009 | Kah | |
| 2010/0172134 A1 | 7/2010 | Moon | |
| 2010/0327302 A1 | 12/2010 | Wang et al. | |
| 2011/0080725 A1 | 4/2011 | Brands et al. | |
| 2011/0080736 A1 * | 4/2011 | Brands et al. | 362/277 |
| 2012/0020062 A1 | 1/2012 | Opolka | |
| 2012/0051063 A1 | 3/2012 | Holder | |
| 2012/0218744 A1 | 8/2012 | Popper et al. | |
| 2013/0027922 A1 | 1/2013 | Chen | |

FOREIGN PATENT DOCUMENTS

| | | |
|---|---|---|
| CN | 202253393 U | 5/2012 |
| EP | 0354961 A1 | 2/1990 |
| JP | 2001345001 A | 12/2001 |
| JP | 2004119045 A | 4/2004 |
| JP | 2006210042 A | 8/2006 |
| KR | 200266609 | 2/2002 |
| KR | 20120096245 A | 8/2012 |
| TW | 201213727 | 4/2012 |
| WO | WO2012012966 | 2/2012 |

OTHER PUBLICATIONS

International Search Report and Written Opinion, issued in PCT Application No. PCT/US2013/043558, mailed Sep. 25, 2013, 9 pages.

International Search Report and Written Opinion, issued in PCT Application No. PCT/US2013/043560, mailed Aug. 27, 2013, 13 pages.

International Search Report and Written Opinion in PCT Application No. US2013/068946 dated Mar. 4, 2014.

* cited by examiner

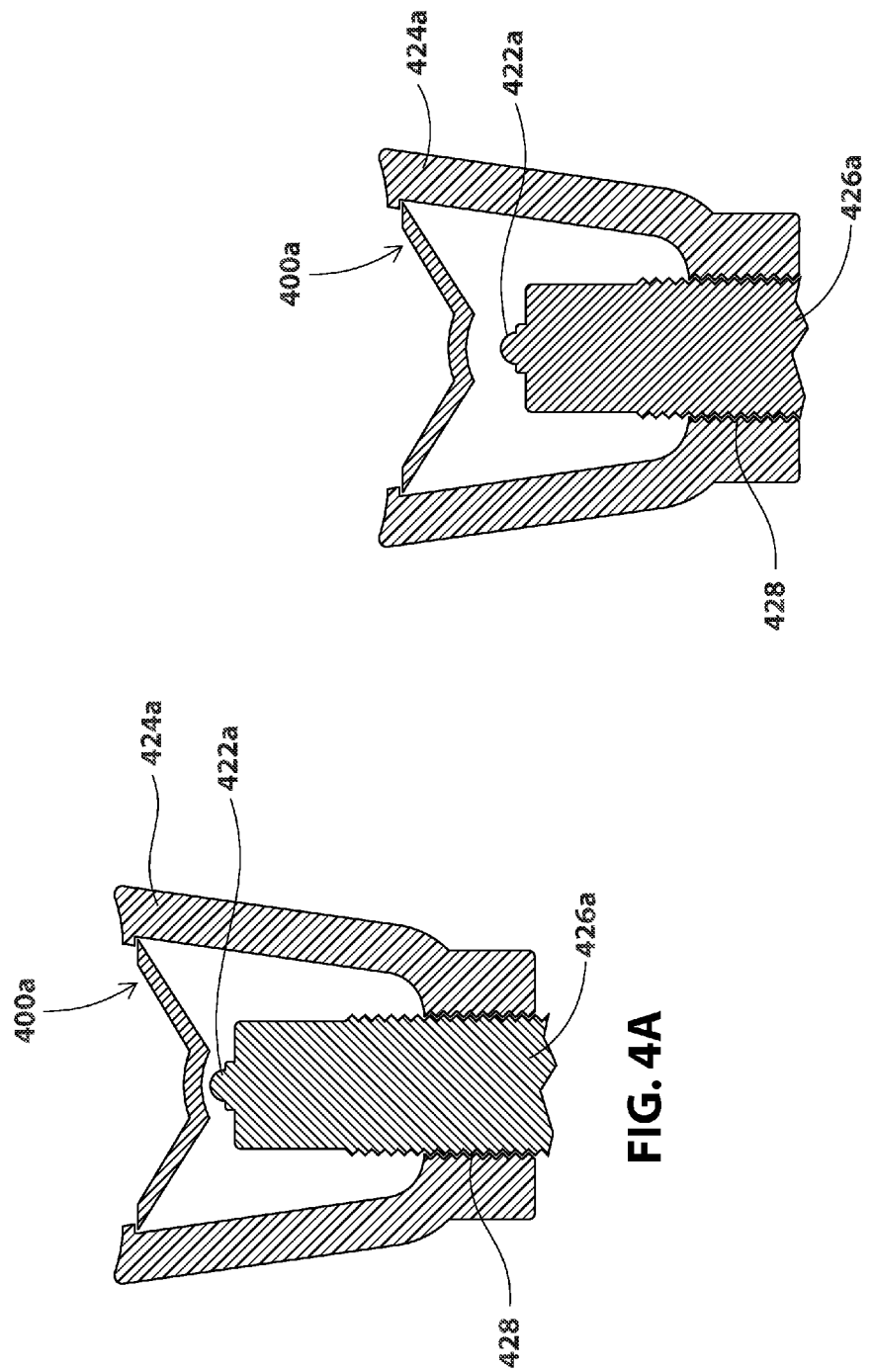

THIN PROFILE LENS FOR FLASHLIGHT

TECHNICAL FIELD

The present disclosure relates to a thin-profile lens for shaping a beam of light from a light source, such as a light emitting diode (LED), for example in a flashlight or other lighting unit. In various embodiments, the lens may be combined with an adjustment mechanism for varying the focus of the beam of light.

BACKGROUND

Lenses for flashlights and other lighting units have been provided in a variety of forms, generally having in common a shape that is symmetrical about an axis along which the light is directed, e.g., the optical axis. Several such lenses have included a hole, such as a rear void, in the back side of the lens adjacent a light source. Within the hole, the light source may be adjusted in position along the optical axis. Adjustment of the light source's position relative to the rear hole of the lens enables variance of a light beam emerging from a front face of the lens. Typically, lenses are limited in their capacity to combine a maximum intensity for a spot beam with a substantial uniformity for a wide beam.

Such lenses typically also were provided with a central convex lens surface on a front face combined with at least one additional convex surface where the light was either received into the lens, reflected within the lens, or emitted from the lens. Without being bound by theory, the additional convex surface may have been deemed necessary for a proper focusing of light from the source into a beam. Such lenses were alternatively provided with light-receiving, reflecting, and emitting surfaces that were flat as viewed in cross-section. Such flat surfaces were also likely deemed necessary for light-focusing or manufacturing purposes.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 4A-4D are four cross-sectional views of a bezel and thin-profile lens system for a flashlight, showing a threaded adjustable bezel with the light source in a wide beam or flood position (FIG. 4A) and a narrow or spot beam position (FIG. 4B), and a slidably-adjustable bezel with the light source in a wide beam or flood position (FIG. 4C) and in a narrow or spot beam position (FIG. 4D)

DETAILED DESCRIPTION OF DISCLOSED EMBODIMENTS

Figure 1A:
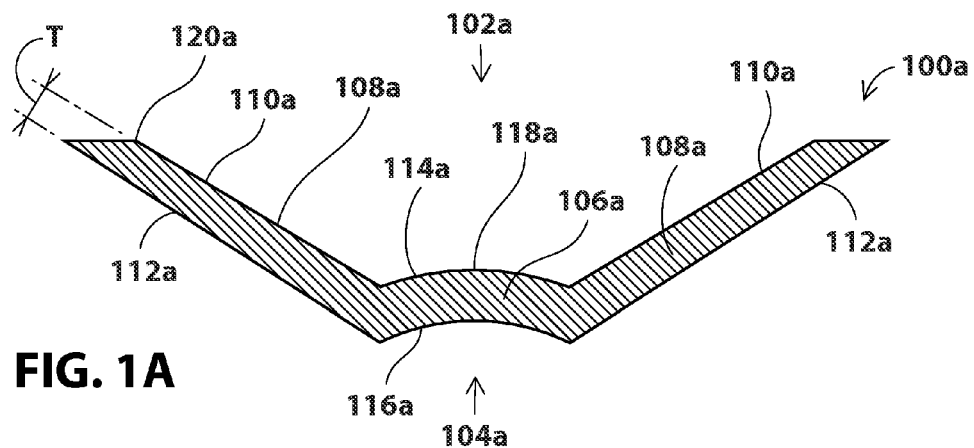
FIGS. 1A-1C illustrate cross-sectional views of three examples of thin-profile lens bodies, including a thin-profile lens having a concave rear surface on the central portion of the lens (FIG. 1A), an example having a flat rear surface on the central portion of the lens (FIG. 1B), and an example having a convex rear surface on the central portion of the lens (FIG. 1C)

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide thin-profile lens systems for flashlights and other lighting devices. In some embodiments, the thin-profile lens system may be combined with a light source and an adjustment mechanism that allows focusing of the light from the source. Other embodiments may provide a fixed-focus beam, thus focusing the beam in a narrow or spot beam, a wide beam or flood light, or in an intermediate-focus beam. In various embodiments, a light emitting diode or LED may be used as the light source, although other light sources, such as incandescent or fluorescent bulbs may be used.

In various embodiments, the lens may be generally circular, and may have a front face configured to emit light and a rear face configured to receive light from the light source. In various embodiments, the lens may be shaped to direct light from the light source in a desired direction, and may have a generally concave front face and a generally convex rear face.

In various embodiments, the lens may include two or more distinct portions, such as a central portion surrounded by an annular ring, and the curvature of each of these two portions may vary independently of one another, depending on the desired beam-shaping properties of the lens and other factors. In various embodiments, the front surface of the central portion may be convex, and the rear surface of the central portion may be convex, concave, or flat, depending on the particular application. The annular ring portion may be generally curved or flat, depending on the application. In some embodiments, the rear surface of the annular ring portion may be reflective or coated with a reflective surface, whereas in other embodiment, the rear surface of the annular ring portion may be clear.

In some embodiments, the thickness of the annular ring portion (excluding the central portion) may vary very little in the different areas, and the lens may lack a receiving void on the rear surface for receiving the light source. Thus, in various embodiments, the lens may be configured such that it lacks any concavities on the rear surface in which the LED or other structures may enter. Without being bound by theory, it is believed that the thin profile of the disclosed lenses permits a more efficient transfer of light through the lens as compared to conventional lenses, and may enable a lower-powered light source to be used to achieve a beam with equivalent or greater brightness as compared to conventional flashlight lenses.

In some embodiments, the lens may be housed in a flashlight bezel, which may couple to or form a portion of a body or housing member. In some embodiments, the body or housing member may include a light source fixably coupled thereto, and the bezel may be adjustable, for example by sliding or twisting, with respect to the body or housing member. In some embodiments, this slidable or twistable adjustability may permit alteration of the distance between lens and light source, thus allowing the light beam to be adjusted from flood or wide bean to spot or narrow beam. In particular embodiments, the bezel may be adapted to couple to a body member that includes the LED fixed thereupon. In these embodiments, the distance between the lens and the LED may be adjusted by virtue of adjusting the position of the bezel on the body member, for instance via a threaded coupling or one or more O-rings. In other embodiments, the position of the light source may be adjustable within the body or bezel, and the system may include an adjustment mechanism for moving the light source relative to the lens, such as a switch, tab and slot, or any other mechanism known to those of skill in the art.

In some embodiments, the annular ring portion of the lens body may define in cross-section an elliptical curve, and may include a light-reflecting surface, which may be configured to reflect the light that strikes it from within the lens body. In various embodiments, the annular ring portion, viewed internally of the lens body as a reflector, may define in cross-section a concave curve. In other embodiments, the annular ring portion viewed from outside the lens body may define a convex curve. In still other embodiments, the annular ring portion may be flat, when viewed in cross section.

In various embodiments, the central surface of the lens may be convex, and so may include a forward-most point, typically at the center of the surface. In various embodiments, the annular ring portion of the front face of the lens body may extend forward to a front rim that is farther forward than the forward-most point of the central surface, thus protecting the lens body from impact and abrasion. The lens body may further include an outer, front rim defining a chamfer between the annular surface and the side surface.

In various embodiments, the flashlight also may include a power supply, such as batteries or an AC-DC converter with electronics to condition a voltage waveform compatible with the LED. For example, in some embodiments, a pulse width modulator may be used to adjust the effective brightness of the LED.

In various embodiments, the lens body, bezel, and optionally, all or part of the body or housing may be formed of a single piece of solid, transparent material, including glass, acrylate polymers, such as polymethyl methacrylate (PMMA), and thermoplastic polymers, such as polycarbonate plastics, molded or otherwise formed as a single piece. In some embodiments, the lens may be formed from a single piece of solid, injection-molded acrylic. In some embodiments, the lens may be co-molded with other parts, such as all or part of the bezel. Optionally, some portions of this integrated piece may be tinted or coated, for example with a light-reflecting or obstructing coating, and/or portions of the bezel may be painted or otherwise tinted to prevent light escape.

Figure 1B:
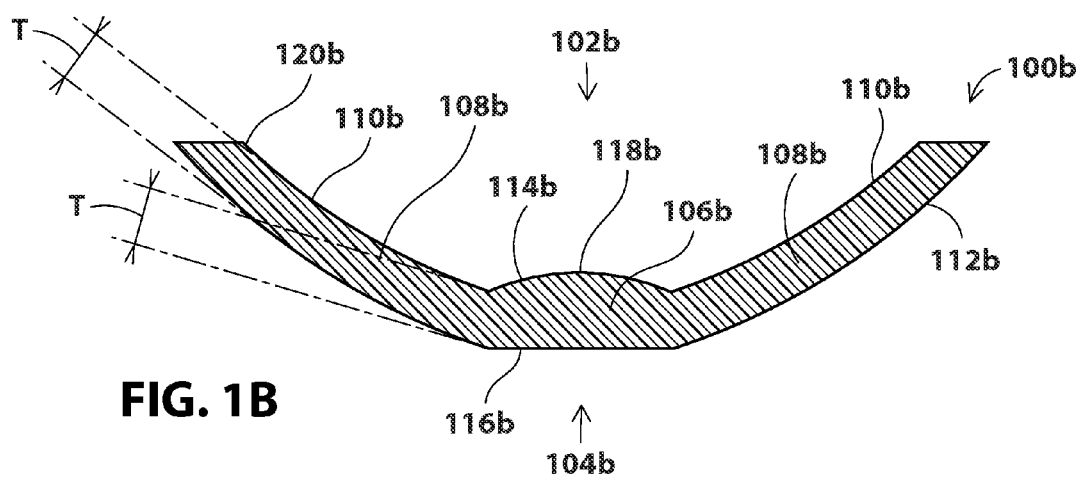
Figure 1C:
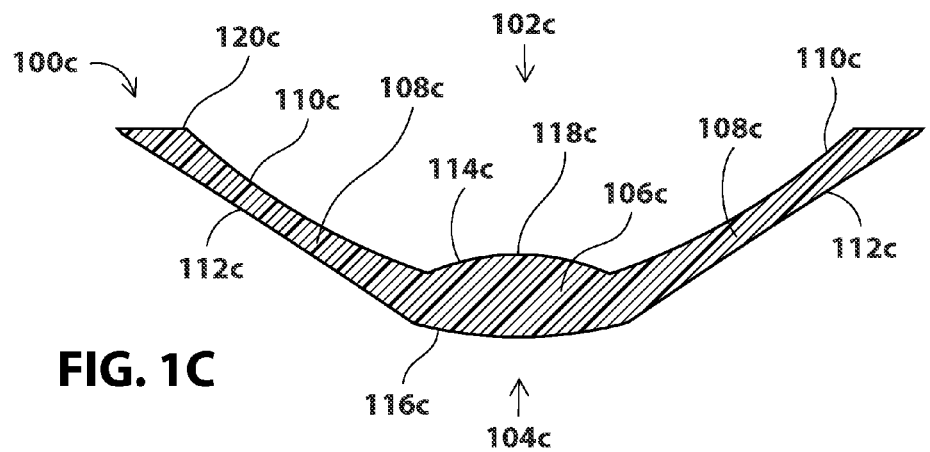

FIGS. 1A-1C illustrate cross-sectional views of three examples of thin-profile lens bodies, including a thin-profile lens having a concave rear surface on the central portion of the lens (FIG. 1A), an example having a flat rear surface on the central portion of the lens (FIG. 1B), and an example having a convex rear surface on the central portion of the lens (FIG. 1C), in accordance with various embodiments. Each lens 100a, 100b, 100c has a generally concave front face 102a, 102b, 102c and a generally convex rear face 104a, 104b, 104c. Each of the illustrated lens bodies 100a, 100b, 100c includes a central portion 106a, 106b, 106c and an annular ring portion 108a, 108b, 108c surrounding central portion 106a, 106b, 106c. In various embodiments, as described in greater detail below, these different lens portions may be configured to direct light from a light source in a desired direction. Although the illustrated lens bodies are shown as having two distinct light-directing portions, one of skill in the art will recognize that suitable thin-profile lenses also may be configured to have only one, or three, four, or more distinct light-directing portions.

In various embodiments, both central portion 106a, 106b, 106c and annular ring portion 108a, 108b, 108c may have a thin profile in cross-section, though both lens portions may have curved or flat front and rear surfaces. For example, in the example illustrated in FIG. 1A, central portion 106a has a convex front surface 114a and a concave rear surface 116a. Annular ring portion 108a has a flat front surface 110a and a flat rear surface 112a, and presents a generally flat profile in cross section.

In the example illustrated in FIG. 1B, central portion 106b has a convex front surface 114b and a flat rear surface 116b. Annular ring portion 108b has a concave front surface 110b and a convex rear surface 112b. As can be seen in FIG. 1B, annular ring portion 108b has a generally curved cross-sectional profile, as compared to the comparatively straight cross-sectional profile 108a shown in FIG. 1A.

In the example illustrated in FIG. 1c, central portion 106c has a convex front surface 114c and a convex rear surface 116c. Annular ring portion 108c has a concave front surface 110c and a flat rear surface 112c. As can be seen in FIG. 1C, annular ring portion 108c has a slightly curved cross-sectional profile, as compared to the comparatively straight cross-sectional profile 108a shown in FIG. 1A.

Although three examples of combinations of lens curvatures are illustrated in FIGS. 1A, 1B, and 1C, one of skill in the art will appreciate that other combinations of flat and/or curved lens surfaces may be substituted to fit a particular application and/or set of beam focusing requirements. Additionally, although lens bodies 100a, 100b, 100c include slight concavities and/or convexities in various portions, one of skill in the art will appreciate that the overall lens shape includes a concave front face, a convex rear face, and the overall thickness of the annular ring portion 108a, 108b, 108c (excluding the central portion 106a, 106b, 106c) when seen in cross section is fairly uniform throughout each lens body 100a, 100b, 100c. In various embodiments, the thickness (T) may be measured generally perpendicularly to the front surface, and may vary less than about 20%, such as 18%, 15%, 12%, 10%, 9%, 8%, 7%, 6%, 5%, 4%, 3%, 2%, 1% or even 0% over the entire width of annular portion 108a, 108b, 108c. In specific, non-limiting embodiments, a suitable lens thickness for the annular ring portion of a small-diameter lens may be about 0.5-4.0 mm, for example 0.5-2.0 mm, or 0.7-1 mm and a suitable thickness for the annular ring portion of a large-diameter lens may be 0.4-4 cm, such as 1-2 cm.

Additionally, all of the illustrated lens bodies lack the rear void or LED receiving well that flashlight lenses typically include. In fact, no portion of any of the lens bodies 100a, 100b, 100c is adapted to receive a LED light source or corresponding heat sink member within any portion of the lens body.

In various embodiments, central portion 106a, 106b, 106c may include a convex front surface 114a, 114b, 114c, defining a forward-most point 118a, 118b, 118c. In various embodiments, convex front surface 114a, 114b, 114c may incorporate any of various curvatures, and in some embodiments, the curvature may be substantially arcuate with a radius of no more than about 2-4 mm for a small-diameter flashlight having an overall lens diameter of less than about 1 cm, for example a lens having an overall diameter of about 6-8 mm. One of skill in the art will appreciate that this central portion diameter may be generally proportionately larger for larger diameter lenses. For example, a large diameter lens of 5-10 cm may have a central portion having a diameter of 1-4 cm, for example about 1.5-2.5 cm. The measurements described with reference to the embodiments of the lens are merely exemplary. Those of ordinary skill in the art will readily understand that other measurements may be used without deviating from the scope of the disclosure.

In various embodiments, annular ring portion 108a, 108b, 108c of lens body 100a, 100b, 100c may extend forward to front rim 120a, 120b, 120c. In various embodiments, front rim 120a, 120b, 120c may extend farther forward than forward-most point 118a, 118b, 118c of central portion 106a, 106b, 106c. In various embodiments, front rim 120a, 120b, 120c may include a chamfer between annular ring portion 108a, 108b, 108c and front rim 120a, 120b, 120c of at least about 0.2-0.5 mm of width for a small diameter flashlight. In some embodiments, the chamfer may have a width selected for a desired lens size and operational characteristics, and, as examples only, may be about 1.5 mm, about 2.0 mm, about 2.5 mm, or about 3.0 mm in width for a larger diameter lens.

Figure 2A:
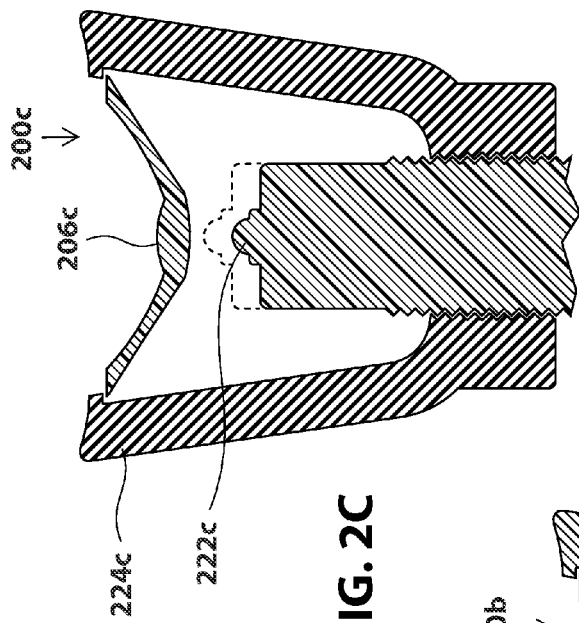
FIGS. 2A-2C illustrate cross-sectional views of the lens bodies illustrated in FIGS. 1A-1C, wherein the thin-profile lenses have a concave rear surface (FIG. 2A), a flat rear surface (FIG. 2B), and a convex rear surface (FIG. 2C), and wherein each of the lenses is housed within a bezel incorporating a light source that is adjustable in position along an optical axis.
Figure 2B:
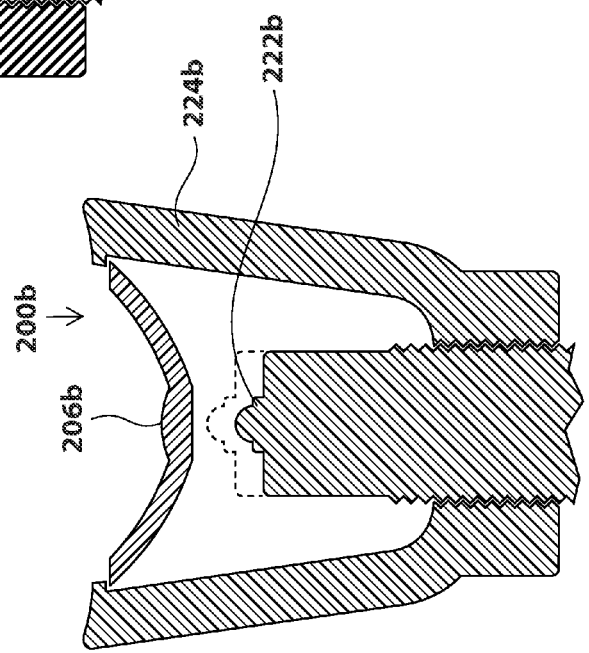
Figure 2C:
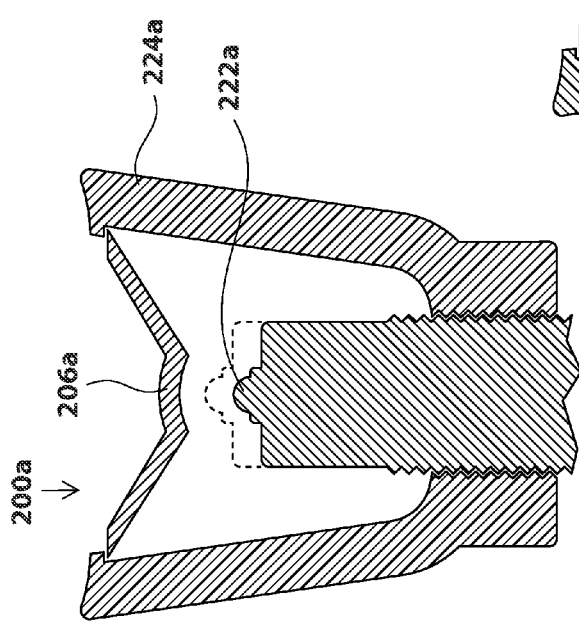

FIGS. 2A-2C illustrate cross-sectional views of the lens bodies illustrated in FIGS. 1A-1C, wherein each of the lenses is housed within a bezel incorporating a light source that is adjustable in position along an optical axis, in accordance with various embodiments. As seen in FIGS. 2A-2C, in various embodiments, lens 200a, 200b, 200c may be paired with a light source, such as LED 222a, 222b, 222c, for example that may be adjustable in position along an optical axis within the bezel 224a, 224b, 224c, from a typical starting position, shown in solid line, through intermediate positions to a final position, indicated by the broken lines. In various embodiments, the adjustment may be continuous or it may be provided with stops or detents at selected positions. Any range of position adjustments may be incorporated as suited to the particular lens size, design, and desired beam variations. In some embodiments, the range is from about 3 mm to about 5 mm for a small-diameter flashlight, and as much as 2-3 cm or more for larger diameter lens systems.

In one specific, non-limiting example of a lens, e.g., for a small-sized lens system, the lens may have a width of about 8 mm, an annular ring portion thickness of about 2 mm, an inner diameter of about 3 mm, a chamfer width of about 1 mm, and a range of position adjustment of about 2 mm. Other combinations may be selected for desired operational characteristics and lens sizes. Typically such dimensional ratios may be varied by at least about ±10%.

In various embodiments, central portion 206a, 206b, 206c may form a focusing element that may interact with a light source in various manners dependent upon, for example, the position of the light source. For instance, in various embodiments, when the light source is far away from the lens (e.g., a narrow angle position), only a small fraction of the light may interact with the focusing element. Consequently, in various embodiments, the focusing element may not noticeably influence narrow light distribution. Conversely, when the light source is near to the focusing element (e.g., a wide angle position), the focusing element may influence the beam pattern in a desired manner. Thus, in various embodiments, the focusing element may enable wide angle light distribution, with little effect on narrow angle distribution. In various embodiments, bezel 224a, 224b, 224c may include a reflective interior surface, for instance in order to aid in directing the light in a desired direction.

Figure 3A:
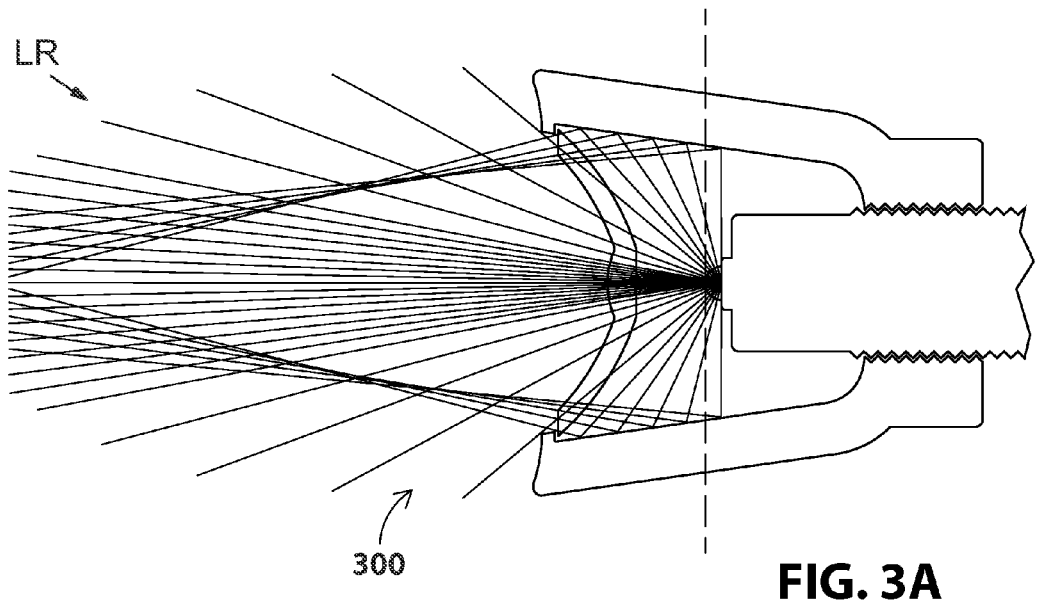
FIGS. 3A and 3B show the light refraction and reflection to form varying beams (FIG. 3A illustrates a narrow or spot beam and FIG. 3B illustrates a wide or flood beam) as the light source is moved with respect to the rear wall of the lens body.
Figure 3B:
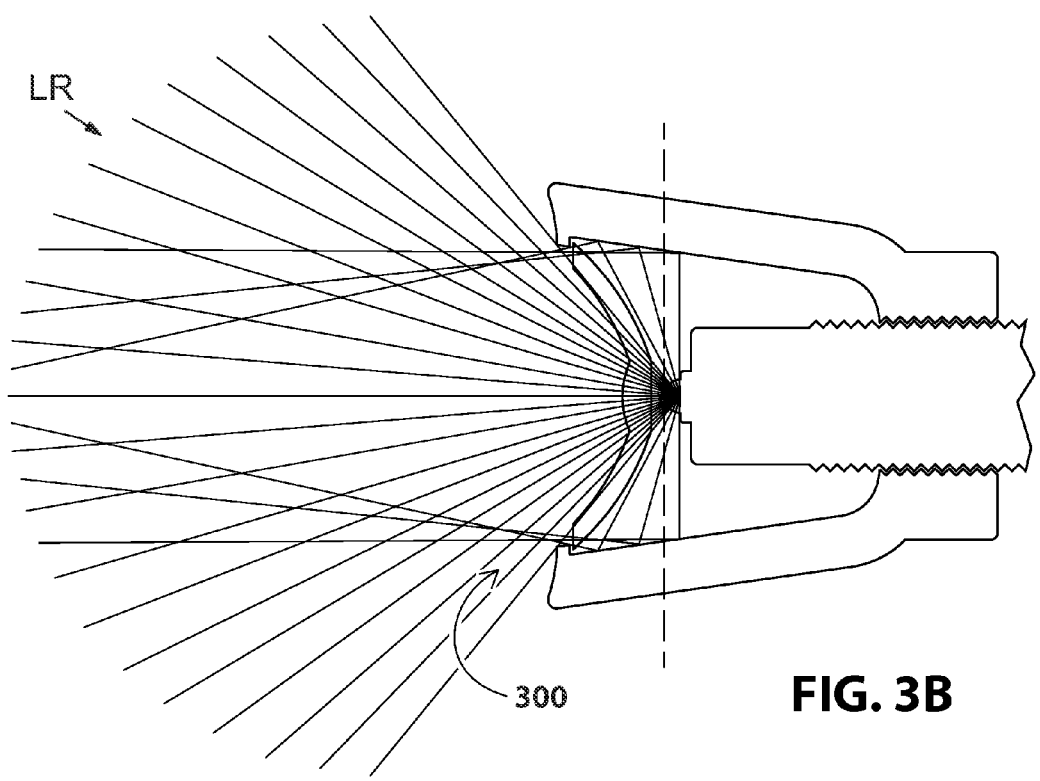

This phenomenon is illustrated in FIGS. 3A and 3B, which show the light refraction and reflection forming varying beams (FIG. 3A illustrates a wide or flood beam and FIG. 3B illustrates a narrow or spot beam) as the light source is moved with respect to the rear wall of the lens body, in accordance with various embodiments. As illustrated in FIGS. 3A and 3B, adjustment of the LED position relative to the lens may provide a beam ranging between a wide beam or flood light (see, e.g., FIG. 3A) and a narrow or spot beam (see, e.g., FIG. 3B). In various embodiments, a spot beam may provide about +/−3° of angular distribution at about 50% of maximum intensity. An example of a wide beam is a distribution with an angular range of about +/−45° over which the intensity is at least about 50% of the maximum or on-axis value. In accordance with various embodiments, the light may be varied from spot beam to wide beam with the adjustment in position of the LED being no more than about 3-50 mm, depending on the lens diameter. A representation of the light rays LR calculated for an example of a lens and LED configuration is shown in each of FIGS. 3A and 3B. As illustrated, in various embodiments, lens 300 may direct a substantial portion of light rays LR into the desired beam and a smaller portion of light rays LR may be expected to travel outside the desired beam.

Figure 4C:
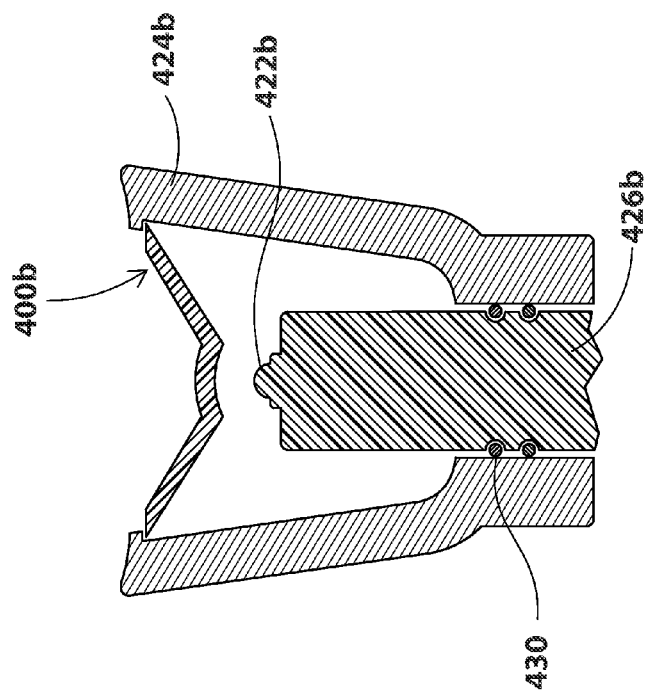

FIGS. 4A-4D are four cross-sectional views of a bezel and thin-profile lens system for a flashlight, showing a threaded adjustable bezel with the light source in a wide beam or flood position (FIG. 4A) and a narrow or spot beam position (FIG. 4B), and a slidably-adjustable bezel with the light source in a wide beam or flood position (FIG. 4C) and in a narrow or spot beam position (FIG. 4D); in accordance with various embodiments. As illustrated, in various embodiments, as shown in FIGS. 4A and 4B, the system may include bezel 424a and a lens 400a house therein. In some embodiments, bezel 424a may be configured to couple to a body member 426a, which may include a light source, such as LED 422a. In some embodiments, the system may also include an adjustment mechanism, such as a threaded coupling or engagement 428 between bezel 424*a* and body member 426*a*, which may permit adjustment of the spacing between the light source and the lens, thus enabling focusing of the resulting light beam as described in detail above.

Figure 4D:
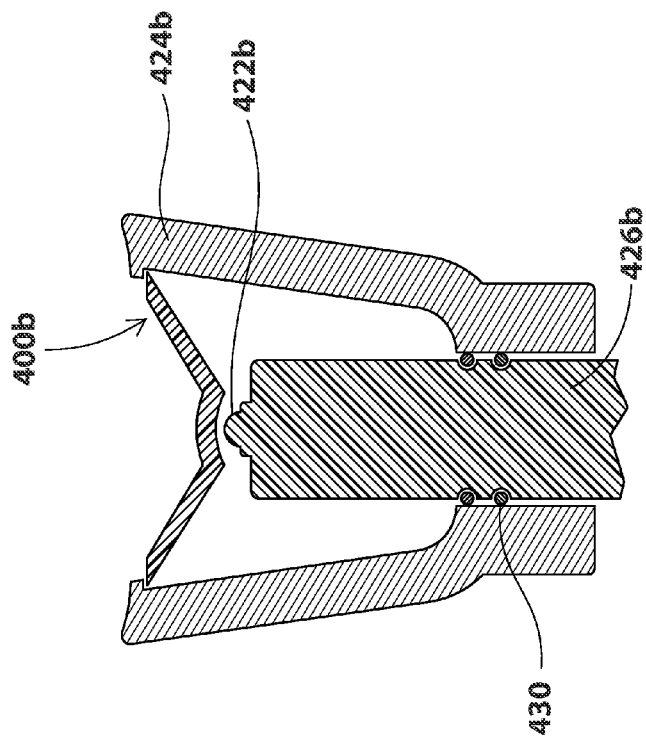

In other embodiments, as shown in FIGS. 4C and 4D, the system may include a lens 400*b* housed within a bezel 424*b* that may be slidably mounted on body member 426*b*. In some embodiments, the slidable mount may include one or more O-rings 430 that may facilitate adjustment of bezel 424*b* on body member 426*b*, which may permit adjustment of the spacing between LED 422*b* and lens 400*b*, thus enabling focusing of the resulting light beam, for instance to produce a spot beam or a flood beam. Although threaded and slidable mounts are illustrated, one of skill in the art will appreciate that any other suitable mechanism allowing a user to adjust the relative positions of the lens and light source may be used.

In various embodiments, the system may be adjusted with the adjustment mechanism as described in order to provide a light beam with a wide beam having a distribution with an angular range of about +/−45° over which the intensity is at least 50% of the maximum or on-axis value. For that wide beam, the system may provide a substantially uniform intensity between at least about +/−10° of angular distribution.

In some embodiments, bezel 424*a*, 424*b* may be provided with a grip-enhanced region, such as a region having grooves, ridges, swellings, textures, or the like, which may extend partially or completely around bezel 424*a*, 424*b*. In various embodiments, the grip-enhanced region may aid a user, e.g., in a one-handed adjustment of the focus of the beam by providing a convenient grip for the thumb and forefinger on bezel 424*a*, 424*b* while body member 426*a*, 426*b* is gripped by the other three fingers. In some embodiments, a control button may be provided on the flashlight body, e.g., at an end opposite bezel 424*a*, 424*b*, or on bezel 424*a*, 424*b* itself.

In various embodiments, body member 426*a*, 426*b* or other housing structures may be made from a metal such as aluminum or steel or a plastic such as ABS. Component materials may be selected to be compatible with lighting unit operation in harsh environments such as very high or very low ambient temperatures.

Figure 5:
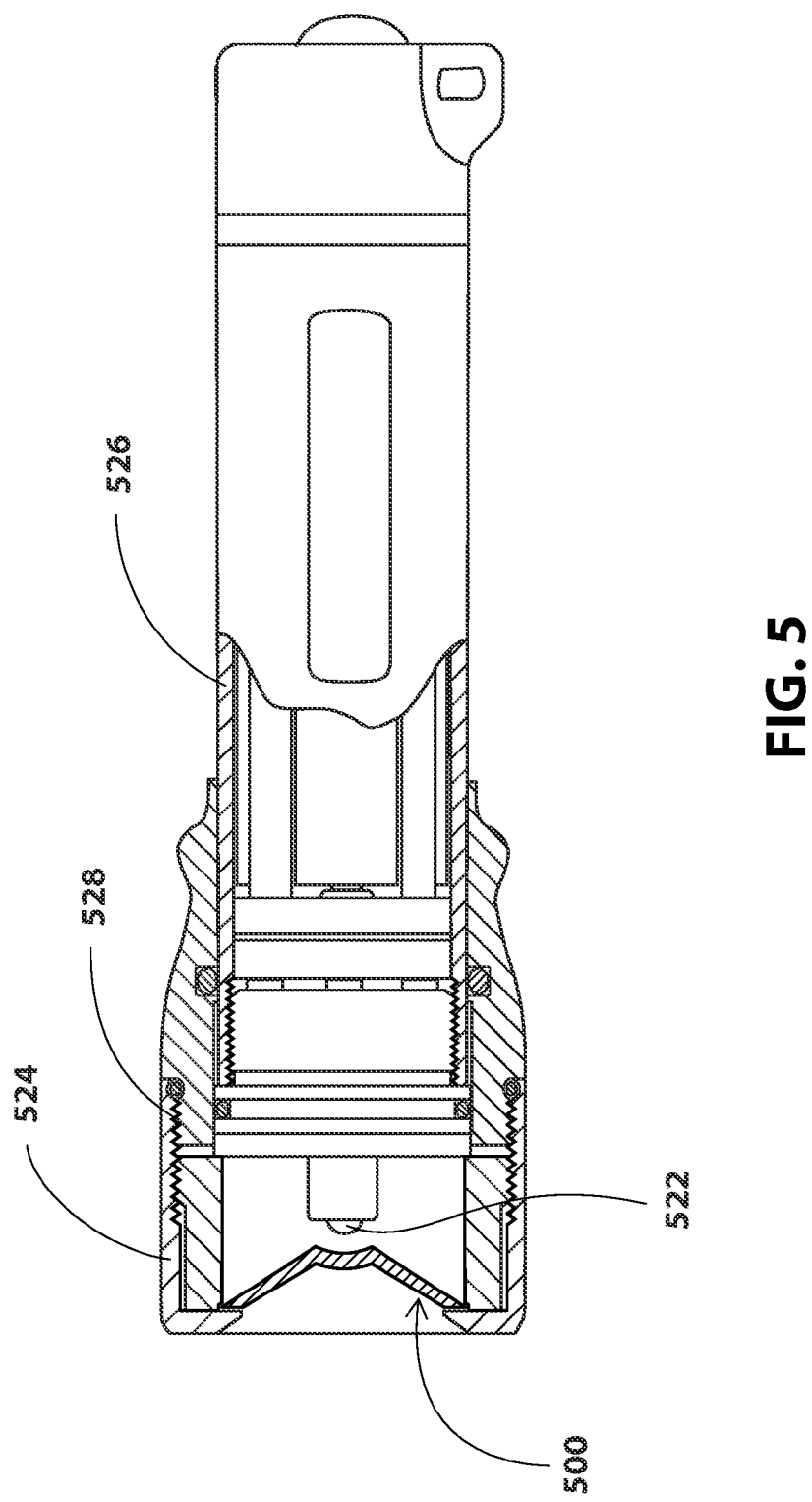
FIG. 5 illustrates a cross-sectional view of an example of a flashlight configured for use with a thin-profile lens system, all in accordance with various embodiments.

FIG. 5 illustrates a cross-sectional view of an example of a flashlight configured for use with a thin-profile lens system, in accordance with various embodiments. In the illustrated embodiment, lens 500 is housed within a bezel 524 that couples to a body member 526 via a threaded engagement 528. In use, a user twist bezel 524 relative to body member 526, thus decreasing or increasing the distance between LED 522 and lens 500, and adjusting the light beam to a flood or wide beam, or to a narrow beam or spot light, as desired by the user. Although a threaded engagement mechanism is illustrated, one of skill in the art will appreciate that any other adjustment mechanism may substituted that allows a user to adjust the distance between lens 500 and LED 522.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A lighting device comprising:
 a housing member;
 a light source coupled to the housing member; and
 a thin-profile lens coupled to the housing member and comprising:
  a generally circular lens body having a generally concave front face and a generally convex rear face, wherein the lens body includes:
   a central portion having a convex front surface, wherein the central portion changes a shape of a light beam from a flood beam to a spot beam when a distance between the light source and the thin profile lens is changed; and
   a transparent annular ring portion surrounding the central portion, wherein the annular ring portion has a curved cross-sectional profile, a concave front surface, and a convex rear surface that receives light from the light beam, wherein the front surface of the annular ring portion is substantially parallel to the back surface of the annular ring portion, wherein the annular ring portion defines a thickness dimension, and wherein the thickness dimension is fairly uniform.

2. The lighting device of claim 1, wherein the thickness dimension varies less than 10% over the lens body.

3. The lighting device of claim 1, wherein the thickness dimension varies less than 2% over the lens body.

4. The lighting device of claim 1, wherein the lens body has a diameter of less than about 1 cm, and wherein the thickness dimension is between about 0.5 mm and about 4 mm.

5. The lighting device of claim 1, wherein the lens body has a diameter of greater than about 5 cm, and wherein the thickness dimension is between about 0.4 cm and about 2 cm.

6. The lighting device of claim 1, wherein the central portion has a concave rear surface.

7. The lighting device of claim 1, wherein the central portion has a flat rear surface.

8. The lighting device of claim 1, wherein the central portion has a convex rear surface.

9. The lighting device of claim 1, wherein the central portion has a concave rear surface, wherein the thickness dimension varies less than 5% over the lens body, and wherein the thickness dimension is between about 2 mm and about 3 mm.

10. A flashlight comprising:
 a housing member;
 a light source coupled to the housing member; and
 a thin-profile lens for a flashlight, comprising:
  a generally circular lens body having a generally concave front face and a generally convex rear face, wherein the lens body includes:
   a central portion having a convex front surface, wherein the central portion changes the focus of a light beam from a spot beam to a flood beam based on a distance between the thin profile lens and the light source; and
   a transparent annular ring portion surrounding the central portion, wherein the annular ring portion has a curved cross-sectional profile, a concave front surface, and a convex rear surface that receives light from the light beam, wherein the front surface of the annular ring portion is substantially parallel to the back surface of the annular ring portion, wherein the annular ring portion defines a thickness dimension, and wherein the lens body lacks a rear void adapted for receiving at least a portion of a light source.

11. The flashlight of claim 10, wherein the thickness dimension is fairly uniform.

12. The flashlight of claim 10, wherein the thickness dimension varies less than 10% over the lens body.

13. The flashlight of claim 10, wherein the central portion has a concave rear surface.

14. The flashlight of claim 10, wherein the central portion has a flat rear surface.

15. The flashlight of claim 10, wherein the central portion has a convex rear surface.

16. The flashlight of claim 10, wherein the central portion has a concave rear surface, and wherein the thickness dimension is between about 2 mm and about 3 mm.

17. A flashlight comprising:
a housing member;
a light source coupled to the housing member;
a power source disposed within the housing member and adapted to provide power to the light source;
a bezel adapted to adjustably couple to the housing member; and
a thin-profile lens adapted to fit within the bezel, wherein the thin-profile lens comprises:
 a generally circular lens body having a generally concave front face and a generally convex rear face, and wherein the lens body includes:
  a central portion having a convex front surface; and
  a transparent annular ring portion surrounding the central portion, wherein the annular ring portion has a curved cross-sectional profile, a concave front surface, and a convex rear surface that receives light from the light beam, wherein the front surface of the annular ring portion is substantially parallel to the back surface of the annular ring portion, wherein the annular ring portion defines a thickness dimension, and wherein the thickness dimension is fairly uniform, and
wherein adjustment of the bezel relative to the housing member adjusts the distance between the thin-profile lens and the light source, and wherein adjustment of the bezel relative to the housing member alters a focus of a light beam passing through the lens.

18. The flashlight of claim 17, wherein the thickness dimension varies less than 10% over the lens body.

19. The flashlight of claim 17, wherein adjustment of the bezel relative to the housing member alters the focus of the light beam from a narrow beam to a wide beam.

20. The flashlight of claim 17, wherein the bezel is adapted to couple to the housing member via a threaded coupling.

21. The flashlight of claim 17, wherein the lens body lacks a rear void adapted for receiving the light source.

* * * * *